Oct. 24, 1967     D. APPLETON ET AL     3,348,251

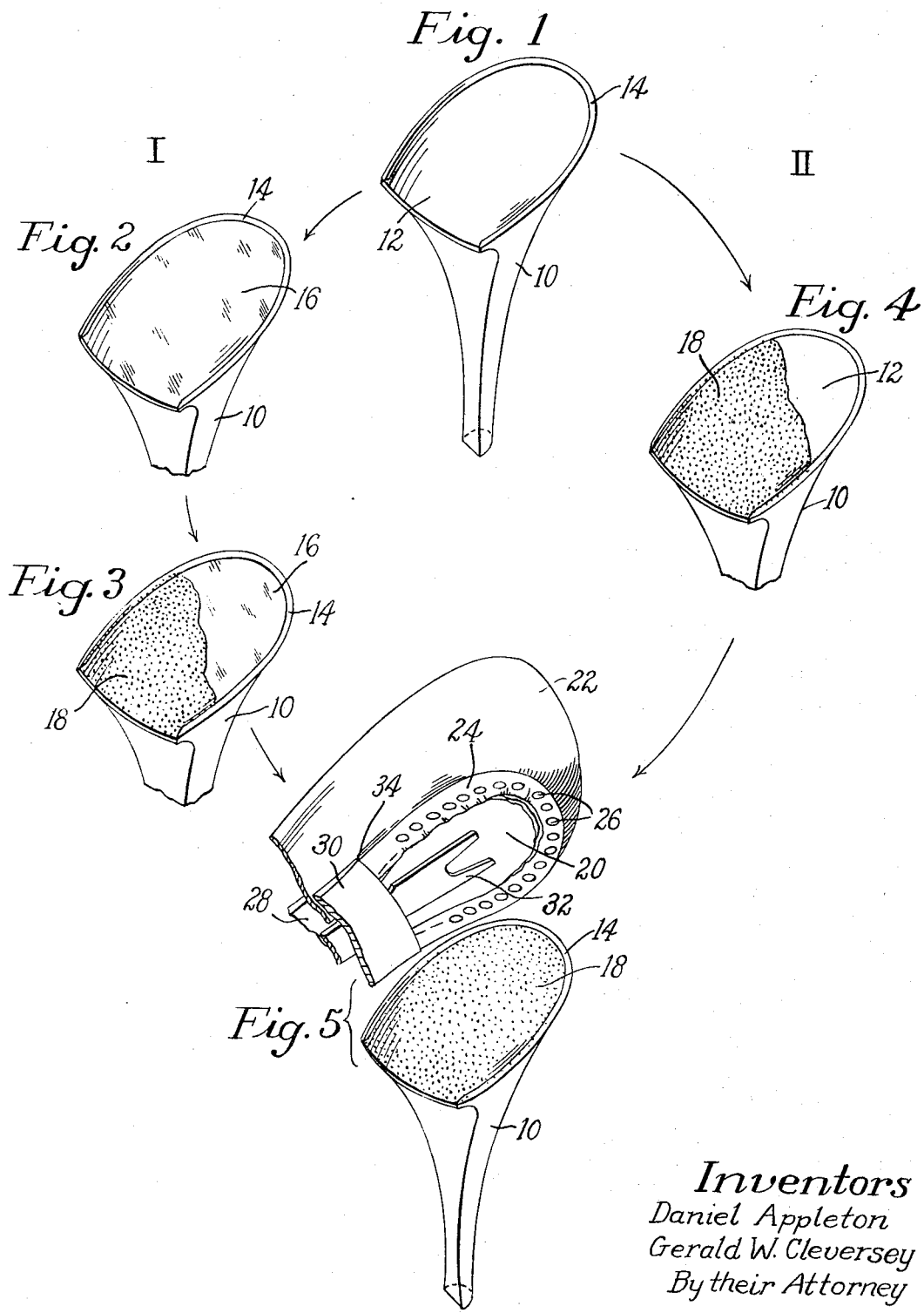

SHOE MANUFACTURING

Filed Jan. 22, 1965

United States Patent Office 3,348,251
Patented Oct. 24, 1967

3,348,251
SHOE MANUFACTURING
Daniel Appleton, Beverly, and Gerald W. Cleversey, Topsfield, Mass., assignors to United Shoe Machinery Corporation, Boston, Mass., a corporation of New Jersey
Filed Jan. 22, 1965, Ser. No. 427,400
4 Claims. (Cl. 12—147)

ABSTRACT OF THE DISCLOSURE

A method for adhesively attaching a heel of synthetic polymeric material to a shoe upper using as an adhesive a mixture of a polyurethane in organic solvent.

---

This invention relates to shoe manufacturing methods and specifically to methods for attaching heels to shoe uppers in the manufacture of women's shoes.

In earlier practices involving the manufacture of women's shoes, heels were attached to shoe uppers by gang nailing or other attaching methods involving multiple mechanical fasteners. The heels then available were generally made of wood, leather, or similar material and as a result that type of attaching method was quite adequate. Splitting of the heels by the nails or other fasteners used was of lesser concern even though many if not the majority of the heels were made of wood. This was for the reason that generally the wooden heels were designed for final use in covered form.

More lately, heels used in women's shoes have been formed from synthetic polymeric materials. For convenience of expression these materials may be referred to as organic plastics or simply plastics. Forming is generally by molding and more specifically injection molding. Nailing of plastic heels is a concern not only from the nature of the material but also because of their slender shape in present style trends, and the fact that many of the plastic heels are designed for final use in uncovered form. With this change in materials has come the direction toward the use of mastic adhesives as primary attachment expedients for these heels. One such adhesive is that which is based on the isocyanate polymers, more commonly referred to as the polyurethanes. The polyurethane adhesive is introduced onto the heel seat engaging surface of the plastic heel as a fluid intermediate reaction product. The heel seat engaging surface is positioned relative to the shoe upper heel seat and the polyurethane adhesive allowed to react further converting to a stiffened state. Foaming accompanies reaction with the result that with curing completed the space between the heel and the upper is taken up by a foamed or cellular, stiffened polyurethane material which serves to contribute adhesive attachment and as well stability to the shoe assembly.

When polyurethane adhesives have been used in plastic heel attaching practices, it has been found necessary to use expedients by which to supplement adhesive attachment at or with the heel seat engaging surfaces of these heels. This has been done through the use of what may be considered mechanical expedients. More specifically the heel seat engaging surfaces of the plastic heels have been provided with added recesses or cavities, see in this regard U.S. 2,975,445 issued in the name of James F. Leahy on Mar. 21, 1961. This expedient may be further improved on by providing the recesses or cavities with undercut sides serving to lock the mastic to the heel seat. However, to practice the latter an added machine operation of routing or cutting to provide the cavities having undercut sides is used. Parenthetically, to provide cavities having undercut sides during the initial molding of the heels would be at best a difficult task. In addition the use of the cavities, undercut or otherwise, calls for the use of added amounts of the adhesive to the extent necessary to fill the added space provided by the locking recesses or cavities.

It is an object of this invention to provide an improved method for adhesively attaching plastic heels, that is heels formed of synthetic polymeric material, to shoe uppers using a polyurethane mastic adhesive.

It is another object of this invention to provide improved shoe assemblies including adhesively attached plastic heels.

It is another object of this invention to provide an improved method as described above which does not require that locking type cavities or recesses be provided in the heel seat engaging surface of the heel.

It is another object of this invention to provide an improved method as described above which requires less polyurethane mastic adhesive than might be otherwise used in order to adhesively attach plastic heels to shoe uppers.

These and other objects of this invention are attained in and from a method for adhesively attaching heels formed from synthetic polymeric material to shoe uppers. In the method (a) a polyurethane mastic adhesive in fluid, foamable reactive form, or to state it differently a fluid intermediate reaction polyurethane product, and, an organic solvent which is capable of solvating the synthetic polymeric material from which the heel is formed, are introduced to the heel seat engaging surface of the heel and (b) the heel seat engaging surface is positioned with respect to the heel seat of the shoe upper and further reaction of the polyurethane is allowed to proceed to provide a foamed or cellular, stiffened polyurethane mass which serves to adhesively attach the heel seat engaging surface of the heel to the heel seat of the shoe upper.

The following drawings are included for the purpose of illustrating various embodiments of the invention in which:

FIG. 1 is a perspective view showing a plastic heel for a woman's shoe;

FIG. 2 is a perspective view, with part broken away, showing a plastic heel as in FIG. 1, having the heel seat engaging surface wiped with solvent;

FIG. 3 is a perspective view, with part broken away, showing the plastic heel of FIG. 2, having mastic applied to a portion of the heel seat engaging surface;

FIG. 4 is a perspective view, with parts broken away, showing a plastic heel as in FIG. 1, having a solvent-mastic mixture applied to a portion of the heel seat engaging surface;

FIG. 5 is a perspective view, with parts broken away and in section, showing the plastic heel of either FIG. 3 or FIG. 4 immediately prior to assembly with a shoe upper;

Figure 6:
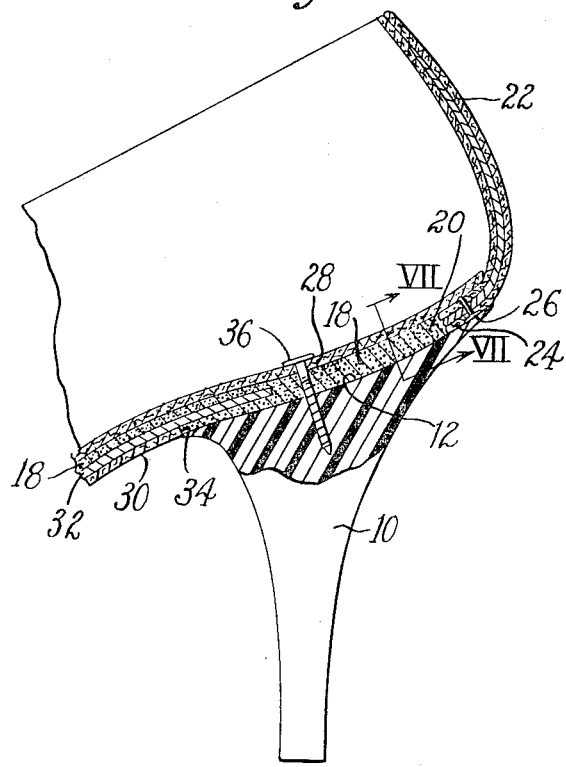
FIG. 6 is a side view with parts broken away and in section showing a plastic heel and shoe upper assembly.

The heels for women's shoes, to which the present invention directs its attention, are those formed from synthetic polymeric materials which as indicated previously may also be referred to as organic plastics or simply plastics. Forming of the heels is generally a molding process; and, usually injection molding procedures are used for this purpose. The synthetic polymeric materials used to form the heels are those which are thermoplastic in nature. This serves to facilitate molding.

Because of the performance required of heels for women's shoes, the synthetic polymeric materials chosen for their production should be capable of meeting various physical requirements. Thus the materials should meet certain minimum standards for dimensional stability, impact resistance, creep resistance and deformation under compressive loads. Plastic materials which may be used include various polyolefins such as the polyethylenes, polypropylenes, either homopolymers or copolymers, also polyvinyl chlorides, polyvinylidene chlorides, polyacrylates and polystyrenes, also polyamides and polyesters may be chosen from. A group of polymers which has been generally decided upon in the trade, from which to mold heels for women's shoes, particularly high and fancy heels, is one which is included within the polystyrenes and is based on three basic monomers to wit: acrylonitrile, butadiene and styrene. In some instances these polymers may be the result of direct interpolymerization, in other instances they may be produced in the form of branch polymers, still others may be blends of homopolymers, and, or copolymers based on those monomers. This group of polymers is commonly referred to as ABS polymers or materials.

The mastic adhesive for use in practicing this invention is a polyurethane which when initially used, that is when applied is in a fluid, foamable, reactive state, that is, it is an intermediate reaction product, and, which, on further reaction, converts to a stiffened, foamed state. Various polyurethane systems can be used for this purpose. One system which is well adapted for use in practice of this invention is a polyurethane which as an intermediate reaction product is a prepolymer, so called, and as such is capable of reacting or curing with foaming on exposure to moisture. The intermediate reaction product, that is the prepolymer, contains reactive isocyanate groups which react on exposure to water or moisture, and preferably from a convenience standpoint on exposure to ambient or atmospheric moisture, causing conversion of the mass into a stiffened foam. Prepolymers which may be used are those based on polyols. Polyols include, in addition to polyhydric alcohols, the polyester polyols and polyether polyols. Principally, the polyester polyols and polyether polyols are used. In order that the prepolymers obtained have some flexibility it is recommended that the polyol used have a molecular weight in the range 500 to 2500 per hydroxyl group present on the polyol.

In producing the prepolymers referred to above, the polyols are reacted with an excess of isocyanate to provide prepolymers having an excess of free or unreacted isocyanate groups. The excess in free isocyanate groups desired on the prepolymer is preferably greater than two free isocyanate groups on a mol ratio basis. As indicated previously, the excess isocyanate groups react with moisture causing the prepolymer to cure to an expanded, stiffened and preferably somewhat resilient state. In order that the expanding-curing reaction may be effectively forestalled prior to use as an adhesive mastic it is prescribed that the polyols for reaction with the polyisocyanate be in at least essentially moisture-free condition and that the polyisocyanate-polyol reaction be carried out under at least essentially moisture-free conditions.

The isocyanate-containing prepolymers which are then in condition for initial use or application as a mastic adhesive in practicing the present invention, react on exposure to water, that is they are moisture curing. The water reacts with the isocyanate groups to provide carbon dioxide which causes foaming or expansion along with curing. Auxiliary blowing agents may be added to the adhesive if desired, but are not necessary. These would include the various fluorocarbons generally used for this purpose. In addition various catalysts, stabilizers such as moisture scavengers and the like may be included. It is also possible to include extenders such as the petroleum derived, high aromatic content hydrocarbon oils, of the type used as rubber extenders. Also, various natural oil derived extenders such as tall oil, cottonseed oil, corn oil and the like may also be used for a similar purpose. Fillers which may be included in the mastic adhesive are sulfur, ground cork, clay, glass fibers, wood pulp, foam glass, gypsum, also alumina silicates, alumina hydroxides, etc. Other fillers may include pitch, bitumins, asphalts, synthetic polymers such as polyvinyl chloride, polystyrene, etc. It is proposed that with respect to extenders and fillers, as well as other additives, that they be free of moisture and that they be nonreactive with the free isocyanate groups contained on the prepolymer. The various fillers and extenders may be included in the prepolymer, on a weight ratio of up to 1:1 filler to prepolymer with good adhesive results being obtained.

The solvents, which may be used in conjunction with the heel mastic adhesive of this invention, are organic solvents which are capable of solvating the plastic or synthetic polymeric material of the heels. In addition, in that variation of the invention which involves admixing the solvent with the polyurethane adhesive mastic some period prior to application of the admixed mastic adhesive to the heel seat engaging surface, the solvent or solvents chosen for use should be nonreactive or effectively nonreactive with the polyurethane mastic adhesive. Another way of stating nonreactivity of the solvents in that variation is that they should contain no reactive hydrogens, that is hydrogens capable of reacting with unreacted isocyanate groups contained in the prepolymer. A number of solvents may be used for this purpose. They include aromatic hydrocarbons such as toluene, xylene, cumene, chlorinated hydrocarbons such as ethylene chloride, ethyl benzene, chlorobenzene, ethylene dichloride, carbontetrachloride, chloroform, benzyl chloride, chlorotoluene, as well as n-butyl acetate, Cellosolve acetate, dimethyl formamide. When the heels involved are formed of ABS polymers, as previously indicated to be common practice, a solvent which has been found to perform extremely well is ethylene dichloride.

Reference will now be made to the drawings where two embodiments of the attaching method of this invention are taken as illustrative of the invention. In the first of these, referred to as Method I, the solvent and the polyurethane adhesive mastic or polyurethane intermediate product in fluid form, are applied to a plastic heel in two separate steps. In the second, or Method II, the polyurethane mastic adhesive, and the solvent in admixture, are applied to the heel in a single step. Aside from those differences the methods may be considered to be the same.

A woman's shoe high heel 10, is shown in FIG. 1 having a heel seat engaging surface 12, of concave shape with an outwardly flaring edge portion 14. Heel 10, as shown, is formed entirely of thermoplastic synthetic polymeric material, example, an ABS polymer. The heel 10 need not be entirely formed of that material, but for practice of this invention at least that portion of the heel 10 which includes the heel seat engaging surface 12 must be so formed.

Practicing attaching Method I a nonreactive solvent 16, example, ethylene dichloride, is brushed or otherwise applied onto the heel seat engaging surface 12 of heel 10 using a suitable applicating means, not shown. The result is as shown in FIG. 2. The solvent 16 may be allowed to stand some time interval, if desired, in order to fluidize the surface 12 prior to applying the mastic adhesive 18 to the solvent treated heel engaging surface 12 as shown in FIG. 3. There is effectively no minimum time for residence of solvent 16 on heel seat engaging surface 12, prior to introduction there of mastic 18. The matter of maximum time however, at least from the standpoint of achieving best attaching results may be readily assessed on the basis of solvent used, the thermoplastic synthetic polymeric material for the heel, and other considerations. It is the intent that mastic 18 be introduced or available to surface 12 when both the mastic 18 and the surface 12 are in fluidized or in the case of the latter at least a swollen condition so that there can be intermingling between portions of the plastic material of the surface 12 and the polyurethane mastic adhesive 18. With curing and foaming of the mastic 18, intermingling of the desired nature then takes place. Further, in this regard, it is proposed to maintain the surface 12 in a fluid or swollen condition for as long a time as possible while reaction, with foaming of mastic 18 is taking place. To return then, as shown in FIG. 3, mastic 18 may be spread onto the heel seat surface 12 using a suitable applicating means, not shown.

The heel 10, having solvent 16 and mastic 18 on the heel seat surface 12 of the same, may be brought into registration with the heel seat portion 20 of a woman's shoe upper 22, of the type shown in FIG. 5. As shown therein, the shoe upper 22 includes an overlasted margin 24 secured by lasting tacks 26 to an insole 28, an outsole 30 and a stiffener 32 extending beyond the rear edge 34 of the outsole 30 and into the heel seat portion 20. Registration, which insures a snug facing of the heel seat engaging surface 12 of the heel 10 to the heel seat portion 20 during the curing and foaming reaction of mastic 18, may be obtained through the use of a temporary nail 36 which is driven through the insole 28 and into the heel 10, see FIG. 6. Other temporary securing means, such as clamps, etc., may be used in place of the temporary nail 36.

Figure 7:
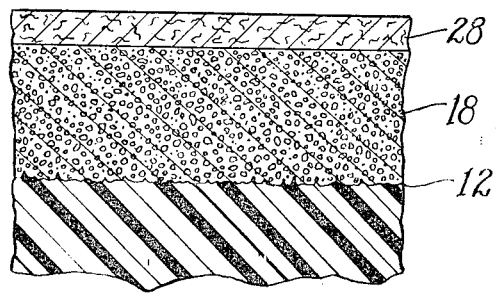
FIG. 7 is a sectional view, in magnification taken along the lines VII—VII of FIG. 6.

After the curing reaction, which includes foaming of the mastic 18, takes place, the adhesively attached or unified structure or shoe assembly obtained may be as illustrated in FIG. 6. The space otherwise defined by the heel seat engaging surface 12 of the heel 10 and the heel seat portion 20 of the upper 22 is taken up by the mastic 18 which is in a stiffened foamed condition. In stiffened, foamed condition, the mastic 18 adhesively bonds to or with various parts of the upper 22 and the heel 10. Adhesion of the various parts of the upper 22 is improved due to the fact that many of the parts or portions of them, such as the stiffener 32, are invested by the stiffened, foamed mastic 18. The peculiar nature of the adhesive bonding obtained between the stiffened, foamed mastic 18 and the surface 12 of the heel 10 from practice of this invention is illustrated in FIG. 7. As shown there, intermingling between interfacial portions of the foamed urethane mastic 18 and the surface 12 of the heel 10 takes place. This results in excellent bonding of the heel 10 through the stiffened, foamed mastic mass 18 to the upper 22.

In the second attaching method, Method II, the polyurethane mastic adhesive 18, at the time of application to heel seat engaging surface 12, is in admixture with the solvent. The mixture is applied in a single step by a spreading means, not shown, onto the heel seat engaging surface 12 of the heel 10. Thereafter the assembling aspects of the method are carried out in the manner previously described with respect to Method I, and described with reference to FIGS. 5–7.

The amount of mastic that may be applied in any given situation to obtain sufficient adhesive bonding between a plastic heel and a shoe upper may be conveniently determined. It will depend upon the particular heel, size and shape, more specifically in the contour of and size of the heel seat engaging surface of the same. In addition to that, the space within the heel seat portion of the upper will have some effect upon this determination. In addition to that, the nature of the particular polyurethane intermediate product to be used, its foaming and bonding capacity, as well as its cellular structure, stiffness, resiliency, etc. in final foamed condition, etc., will bear on this determination. Using the moisture-curing polyurethane intermediate product defined previously, with ABS polymer heels, it may be expected that 2.5 to 4.0 grams of the mastic will provide an excellent attaching mass between the heel and upper.

In using the moisture-curing polyurethane intermediate product, previously described, the isocyanate containing polyol prepolymer, that is, the density of the stiffened foamed mastic mass, may be expected to be about 20 lbs. per cubic foot. This is higher than may be expected with a free blow of that material for the reason that there is more resistance to expansion, the resistance being the result of the confining of the same by the assembled shoe parts. In the event that the mass is applied in admixture with the solvent, the density may be expected to be slightly lower than 20 lbs. per cubic foot. A density ranging 15 to 20 lbs. per cubic foot may be expected to give good adhesive bonding between upper and heel.

The amount of solvent which may be used in either method of application will depend primarily upon the particular solvent to be used as well as the plastic material from which the heel is formed. For instance, when the heels to be attached are ABS polymer material and the solvent to be used is ethylene dichloride, the amount of solvent may range from 2 to 12 parts by weight based on the total amount of polyurethane mastic adhesive and filler, extender, etc. A more preferred range for this is 5 to 6 parts by weight based on the total weight of mastic adhesive and filler, extender, etc.

The following example is provided for the purpose of further illustrating the invention:

EXAMPLE I

A. *Preparation of fluid mastic adhesive (polyurethane intermediate reaction product)*

The following materials are mixed together thoroughly on a ball mill.

| | P.p.w. |
|---|---|
| Polyethylene glycol (MW 600) | 200 |
| Sulfur (dry) | 200 |
| Molecular sieve powder (Linde 5A) | 8 |

The mixture is transferred to a stirred reactor which has been purged of moisture, and 266 p.p.w. (parts per weight) of polymethylene polyphenylisocyanate are added. The reaction which results is allowed to proceed for three hours. Moisture-free conditions are maintained in the reactor during reaction. The intermediate reaction product, having an available isocyanate (unreacted) content of 7.84% by weight is then removed from the reactor and placed in a moisture-free container for storage until use.

B. *Mastic application and testing*

Women's high heels, molded of synthetic polymeric material, specifically "Cycolac" which is an ABS polymer, are attached to shoes (size 7) of usual leather construction, while the latter are positioned on lasts. The mastic adhesive used is the polyurethane intermediate reaction product prepared according to paragraph A above. The amount of mastic adhesive, including the sulfur filler used in attaching each heel is 2.5 grams. In some instances ethylene dichloride solvent is wiped onto the heel seat engaging surfaces of the heels prior to application of the mastic adhesive as it is obtained directly from A above, see Method I previously described. In other instances the mastic adhesive including sulfur filler, is admixed with between 5 and 6 percent of ethylene dichloride based on the weight of the mastic and filler. This mixture is applied directly to the heel seat engaging surfaces with no solvent wiped on previously, see Method II previously described.

The heels are then registered and temporarily secured to shoe uppers, using in each case a single 0.625 inch×15 wire×0.25 inch head shoe nail. The heel and upper assemblies are then maintained under room conditions, allowing the mastic to react with curing and foaming, for a period of 48–72 hours. When the adhesive attachment between heels and uppers is checked thereafter it is found that in all cases it exceeds the attachment obtained using a 0.625 inch×15 wire drive screw in conjunction with gang nails (5) size 0.625×15 wire 0.15 inch head.

A number of women's shoe heels molded from ABS ("Cycolac") resin are attached to size 7 leather uppers. Some of these heels are provided with precut cavities in their heel seat securing surfaces. The cavities are each 1.0 inch long and in cross section are 0.25 inch at their tops or openings, 0.35 inch at their bottoms, and 0.25 inch in depth. The sides of the cavities then are undercut. The remaining heels are without cavities.

In general the procedure to be now followed calls for providing each of the heels with a sample of the fluid, polyurethane mastic adhesive prepared in accordance with paragraph A above. The shoe assemblies then obtained are placed in an Instron Tensile Tester. There they are each subjected to a pulling force directed rearward from the breast line. The force required to cause an 0.25 inch gap between the heel seat and breast is taken as the test results.

Specifically the heels without cavities while being attached in the manner indicated above fall into three categories. Each category involves application of 3.0 grams of sulfur filled mastic to the heel seat securing surfaces of the heels. The categories include those in which (1) heels are attached to uppers by application of mastic alone (no solvent used), (2) heels attached to uppers in which solvent and mastic are applied separately in the manner of Method I described previously, and (3) heels are attached to uppers using a mixture of solvent and mastic applied in a single step, in the manner of Method II described previously. In each of those three categories a temporary positioning nail is used. In a fourth category using heels without cavities (4) heels are attached to uppers using a mixture of the solvent and sulfur filled mastic adhesive using clamps instead of nails.

A number of heels having the cavities previously described are also attached in the indicated manner. These use 3.5 grams of the mastic prepared according to paragraph A above, and do not include solvent, ethylene dichloride or other, either wiped on previously or included in admixture with the mastic. This category of heels (5) does include the use of temporary positioning nails.

The results obtained from the testing of the shoes are as follows. Each of the test results represents the average of 5 sample tests. In the instances where temporary nails are used they are drive screw nails 0.25×0.625×15 wire.

|   | Heels | Mastic, grams | Solvent | Nail | Lbs. Force |
|---|---|---|---|---|---|
| 1 | Without cavities | 3.0 | None | Yes | 100 |
| 2 | do | 3.0 | Yes, separately applied | Yes | 140 |
| 3 | do | 3.0 | Yes, admixed with mastic | Yes | 153 |
| 4 | do | 3.0 | Yes, admixed | No | 120 |
| 5 | With cavities | 3.5 | None | Yes | 120 |

The results obtained from the testing are clearly indicative of the improvement in attaching plastic heels to shoe uppers which may be derived from practicing the present invention.

It will thus be seen that the objects set forth above, among those made apparent from the preceding description, are efficiently obtained and, since certain changes may be made in carrying out the above shoe manufacturing method and in the shoe products set forth without departing from the scope of the invention, it is intended that all matter contained in the above description, or shown in the accompanying drawings shall be interpreted as illustrative and not in a limiting sense.

Having thus described our invention, what we claim as new and desire to secure by Letters Patent of the United States is:

1. A method for adhesively attaching a heel formed of synthetic polymeric material to a shoe upper which comprises:
  (a) applying to a heel seat engaging surface of a heel a mixture of a polyurethane mastic adhesive in fluid, foamable, reactive form and an organic solvent capable of solvating the said synthetic polymeric material, and
  (b) while maintaining the heel seat engaging surface of the heel positioned relative to a heel seat of a shoe upper allowing the polyurethane to further react and provide the polyurethane in stiffened foamed form serving to adhesively attach the heel to the shoe upper.

2. A method according to claim 1 wherein the synthetic polymeric material is an acrylonitrile-butadiene-styrene based polymeric material.

3. A method according to claim 2 wherein the solvent is ethylene dichloride.

4. A method according to claim 1 wherein the polyurethane mastic adhesive includes sulfur as a filler material.

References Cited
UNITED STATES PATENTS

| | | | |
|---|---|---|---|
| 2,975,445 | 3/1961 | Leahy | 12—147 |
| 3,054,713 | 9/1962 | Walter. | |
| 3,063,958 | 11/1962 | Perkins et al. | 12—142 X |
| 3,116,501 | 1/1964 | Markevitch | 36—19.5 X |

JORDAN FRANKLIN, *Primary Examiner.*

A. R. GUEST, *Assistant Examiner.*